Oct. 27, 1936.   E. G. BEIDERMAN   2,058,553
ELECTRIC WELDING
Filed Sept. 30, 1935    2 Sheets-Sheet 1
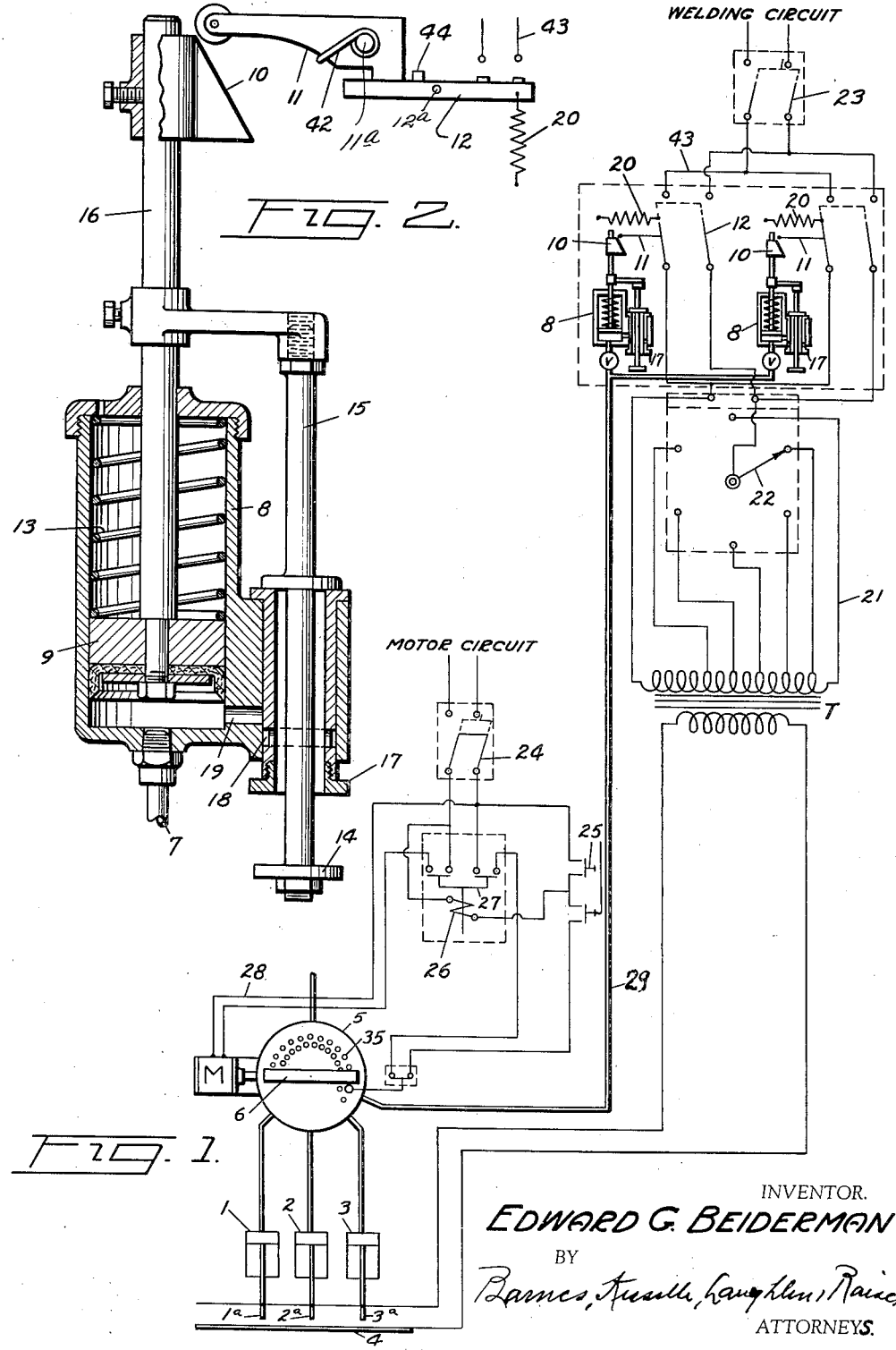
INVENTOR.
EDWARD G. BEIDERMAN
BY
Barnes, Russell, Laughlin & Raisch
ATTORNEYS.

Oct. 27, 1936.  E. G. BEIDERMAN  2,058,553
ELECTRIC WELDING
Filed Sept. 30, 1935  2 Sheets—Sheet 2

INVENTOR.
EDWARD G. BEIDERMAN
BY
ATTORNEYS.

Patented Oct. 27, 1936

2,058,553

UNITED STATES PATENT OFFICE 2,058,553

ELECTRIC WELDING

Edward G. Beiderman, Detroit, Mich., assignor to General Motors Corporation, Detroit, Mich., a corporation of Delaware Application September 30, 1935, Serial No. 42,735

3 Claims. (Cl. 219—4)

This invention relates to electric welding and has for its object an improved mechanism for timing the weld. Timing of the weld has heretofore been effected by suitably mechanically driven timing cams, by melting of the work, and by a passage of a given amount of electric energy controlled by electro-sensitive devices, etc. These several devices, while giving more or less satisfaction, are open to certain objections, such as requiring the presence of rotary driven parts, or expensive electrical and wiring equipment, etc.

In portable welders, it is now quite common to use fluid pressure to press the electrodes upon the work and also to use the same fluid pressure to switch on the current. It has also been proposed to have this same switching on of the current by fluid pressure time the duration of the flow of the current in the primary circuit. However, this has not been satisfactory especially for quick spot welding on account of the lag of the fluid. This is particularly true in repeat welders and gang welding machines where the fluid is successively distributed to separate welding electrodes. The fluid is not sufficiently alert to make fluid-actuated timing practicable. However, my improved fluid timing arrangement overcomes this defect and very rapid repeat welds may be made or rapid successive welds in a gang welding machine.

In the drawings:

Fig. 1 is a diagrammatic view of a gang welder employing my improvement.

Fig. 2 is a longitudinal section of the improved timing cam and pneumatic actuator.

Figures 3, 4, 5, 6:
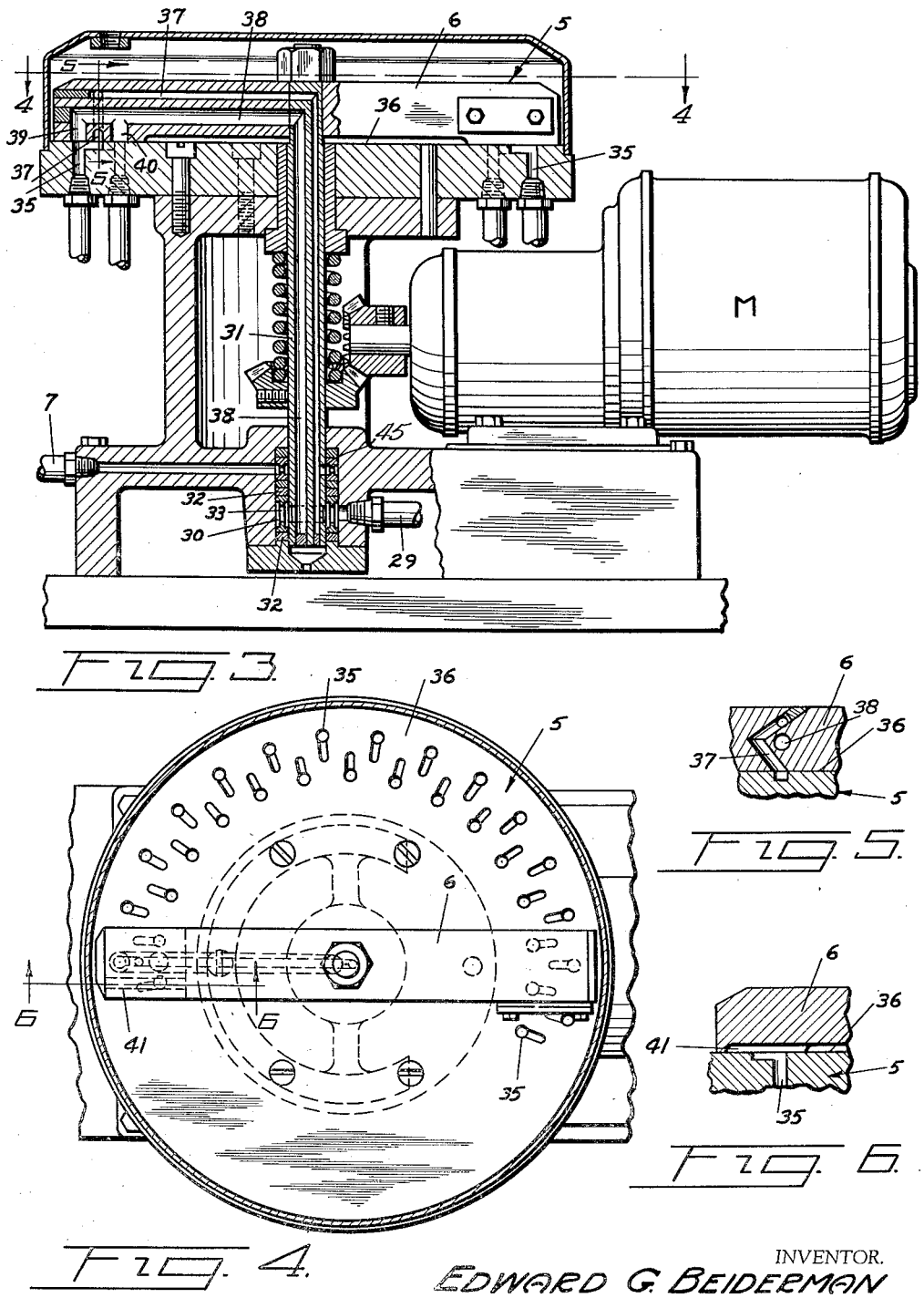
Fig. 3 is a vertical section of the air distributor.
Fig. 4 is a plan view of the same.
Figs. 5 and 6 are sections on the corresponding section lines of Figs. 3 and 4.

1, 2, and 3 indicate separate air cylinders which control the movement of electrodes 1a, 2a, and 3a. 4 is the electrode which is a companion to all the electrodes 1a, 2a, and 3a, and upon which the work may be laid. This is an example of a gang welder in which successive shots of compressed air are directed into the cylinders by means of distributor 5. 6 is a distributor arm driven by the electric motor M. When the distributor arm 6 is driven in revolution, it registers with successive slots connecting a source of compressed fluid with successive cylinders. The details of the flow of the fluid are given hereinafter. At the same time, the pressure is shot through the air line 29 to the air cylinder 8. This causes the piston 9 to rise in the cylinder and the timing cam 10 trips the trigger 11 pivoted at 11a and holds the switch lever 12 pivoted at 12a in primary circuit 43 closed while the arm and roller passes over the inclined face of the cam. The cam can snap by the trigger on the return stroke, the trigger being flopped down against the stress of the torsion spring 42. 44 is a stop to prevent the switch arm rising above a given position due to the pull of spring 20. It will readily be seen that by changing the inclination and the length of the cam, that the timing of the weld can be regulated, also by changing the strength of the piston return spring 13 or by changing the pressure of the fluid.

When a given travel of the piston takes place, the collar 14 on the end of the rod 15 which is attached to the piston rod 16 strikes the relief valve 17 and raises the annular groove 18 into registry with the exhaust port 19 in the cylinder. This immediately releases the pressure below the piston and the spring 13 forces the piston back and spring 20 opens the switch in the primary circuit 21 of the transformer T.

The air line 29, preferably, may be connected to either the left hand air cylinder or the right hand cylinder. It is shown connected to the left hand one in the diagrammatic view, Fig. 1, but it is in a position to be connected with the right hand cylinder in case it is desirable on account of failure of any of the parts. This is an assurance against the break down of the machine.

Now as to some of the independent details of the machine that happen to be shown in the drawings: 22 is an adjustable bridge which may be swung around to the several stations to cut in or cut out some of the coils of the primary to change the voltage in the secondary. 23 is a line switch in the welding circuit. 24 is a line switch in the motor circuit. This motor circuit is controlled by a push button switch 25 that closes the circuit through the solenoid 26 which, in turn, controls the switch 27 in the circuit 28 that controls the motor.

The details of the distributor are shown in Figs. 3 and 4. A source of compressed air is the pipe 7. The air passes into an annular groove about the rotating stem 31 of the distributor arm. Suitable packing 32 is provided about the rotating stem and admits air to the passageway 37 which connects the port 45 by means of branches 39 and 40 with the narrow ends of the ports 35 in the face of the distributor plate 36. The passageway 37 leads around the return passageway 38 (Fig. 5) and can connect with either ring of staggered ports which appear on the face of the distributor. The staggering of the ports permits of closer groupings of the ports upon the distributor.

The action is as follows: The air, through the air pipes, passes into the passageway leading to the narrow ends of the ports in the distributor plate. It passes to successive cylinders controlling successive electrodes as the end of the passageway 37 registers with the narrow ends of successive ports. The air not only passes to the selected electrode cylinder, but at the same time passes through the return passage 38 down through the stem 31 and via annular groove 30 and port 33 out through the pipe 29 to the air cylinder 8 which controls the timing cam.

The air is exhausted from the air passages particularly the air passage from the electrode when the passageway 41 (Figs. 4 and 6) in the arm follows into registry with the port in the distributor plate which has last been afforded a shot of air. This exhausts the air to the atmosphere through the passageway 41 as shown in Fig. 6. It also exhausts the air in the pipe 38 leading to the timing cam cylinder, but this relief is not sufficiently quick and adequate in capacity to produce a proper timing action. In my improvement, the main avenue of exhaust for the timing cylinder is through the relief valve that has already been described and which is designated 17.

The particular type of distributor shown, including the exhausting arrangement, is in no way essential to what I regard as the gist of this invention. Instead of a distributor for a multiple welder, some other form of air valve might be used, as for instance with a repeat welder. It is highly desirable to get accurate timing of the current and the intervals between current shots in rapid welding. The important thing is that by providing the relief valve connected with the timing cam-piston, the timing action is in no way impaired by reason of the lag of the air in the pipes. The duration of the current is very short, for instance, we prefer to use two cycles which is 1/30th of a second and in some welding as little is used as one-half a cycle which is 1/120th of a second. With such short duration of the current, it is impossible to get accurate timing if the exhausting is done through the distributor or a remote regulating device where the air is ordinarily controlled. So the supplemental relief valve is provided directly at the timing cam which gives substantially instantaneous response and overcomes the lag or inertia of the fluid.

What I claim is:

1. In an electric spot welder, the combination of a pair of electrodes, an air cylinder and piston for forcing the electrodes towards each other, a primary and secondary circuit, the primary including a switch, means for opening said switch, a source of pneumatic pressure communicating with the said air cylinder, a second air cylinder and piston connected with said source, timing apparatus for said primary switch operated by air pressure delivered to said second cylinder, a relief valve in the form of a sleeve immediately adjacent said second cylinder operated by a given traverse of said piston for immediately releasing the pressure in said cylinder and permitting the return of the piston in the second cylinder, a rod connected with said piston passing through said sleeve and provided with a collar for so operating said relief valve and means for so returning said piston.

2. In an electric spot welder, the combination of a pair of electrodes, an air cylinder and piston for forcing the electrodes towards each other, a primary and secondary circuit, the primary including a switch, a source of pneumatic pressure communicating with the said air cylinder, a second air cylinder and piston connected with said source the latter having a valve operating rod movable therewith, timing apparatus for said primary switch operated by air pressure sent to said cylinder for closing the said primary switch and a slide valve attached to said cylinder operated by said rod for relieving the said cylinder when the piston has made a given traverse to permit the return of the second piston.

3. In an electric spot welder, the combination of a pair of electrodes, an air cylinder and piston for forcing the electrodes towards each other, a welding circuit, said circuit including a switch, means for opening said switch, a source of pneumatic pressure communicating with the said air cylinder, a second air cylinder and piston connected with said source, timing apparatus for said switch operated by air pressure delivered to said second cylinder, a relief valve immediately adjacent said second cylinder operated by a given traverse of said piston for immediately releasing the pressure in said cylinder and permitting the return of the piston in the second cylinder, and means for so returning said piston.

EDWARD G. BEIDERMAN.